May 12, 1925.  
C. W. WELLS  
FRUIT DRYING DEVICE  
Filed July 22, 1922  
1,537,907  
3 Sheets-Sheet 1

C. W. Wells, INVENTOR
BY Victor J. Evans, ATTORNEY

WITNESS:

May 12, 1925.

C. W. WELLS

FRUIT DRYING DEVICE

Filed July 22, 1922

C. W. Wells_
INVENTOR

BY *Victor J. Evans*
ATTORNEY

WITNESS:

May 12, 1925.

C. W. WELLS 1,537,907

FRUIT DRYING DEVICE

Filed July 22, 1922    3 Sheets-Sheet 3

C. W. Wells,
INVENTOR

BY *Victor J. Evans*
ATTORNEY

WITNESS:

Patented May 12, 1925.

1,537,907

UNITED STATES PATENT OFFICE.

CLARENCE W. WELLS, OF CHERRYVILLE, NORTH CAROLINA.

FRUIT-DRYING DEVICE.

Application filed July 22, 1922. Serial No. 576,828.

*To all whom it may concern:*

Be it known that I, CLARENCE W. WELLS, a citizen of the United States, residing at Cherryville, in the county of Gaston and State of North Carolina, have invented new and useful Improvements in Fruit-Drying Devices, of which the following is a specification.

This invention relates to a drying apparatus, the general object of the invention being to provide means for drying fruits, vegetables and other articles by artificial heat.

Another object of the invention is to provide means for heating canned articles and for treating meats with chemicals and the like.

A still further object of the invention is to provide means for boiling liquids and for subjecting food materials to a cooking or drying process by heat furnished from the boiling liquid.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
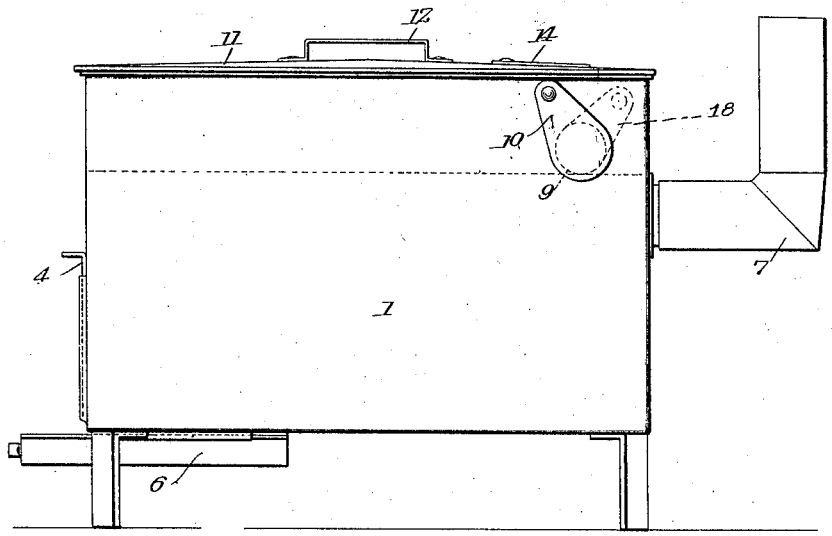
Figure 1 is a side view of the invention.
Figure 3:
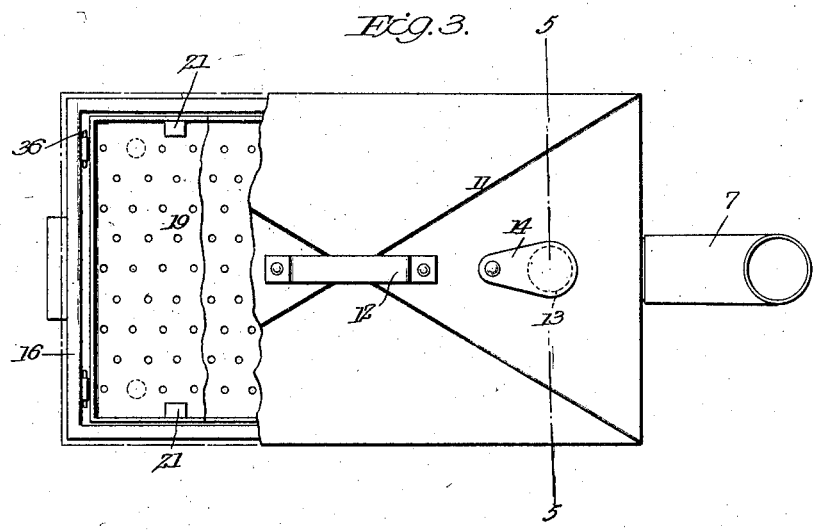
Figure 3 is a plan view.
Figure 2:
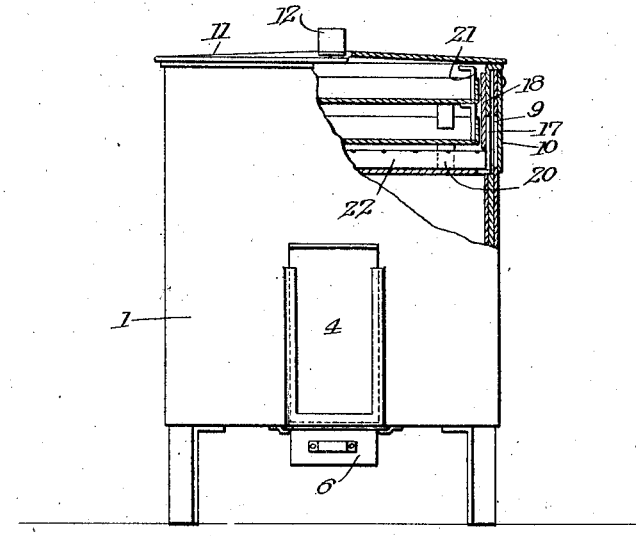
Figure 2 is an end view thereof.
Figure 4:
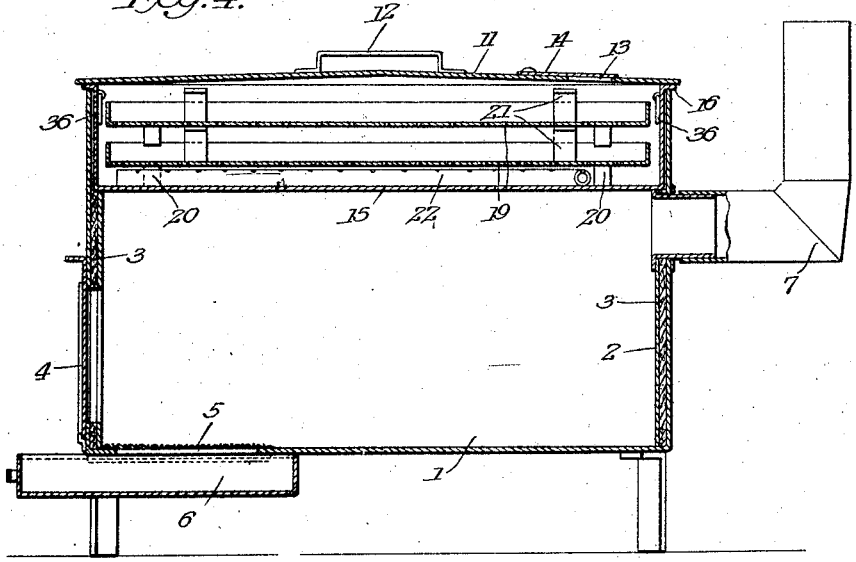
Figure 4 is a longitudinal sectional view.
Figure 5:
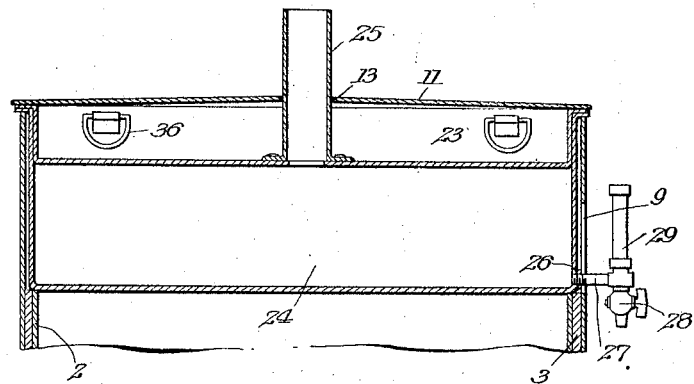
Figure 5 is a sectional view on approximately the line 5—5 of Figure 3, but showing an arrangement which acts for heating water and heating articles from the heat from the water.
Figure 6:
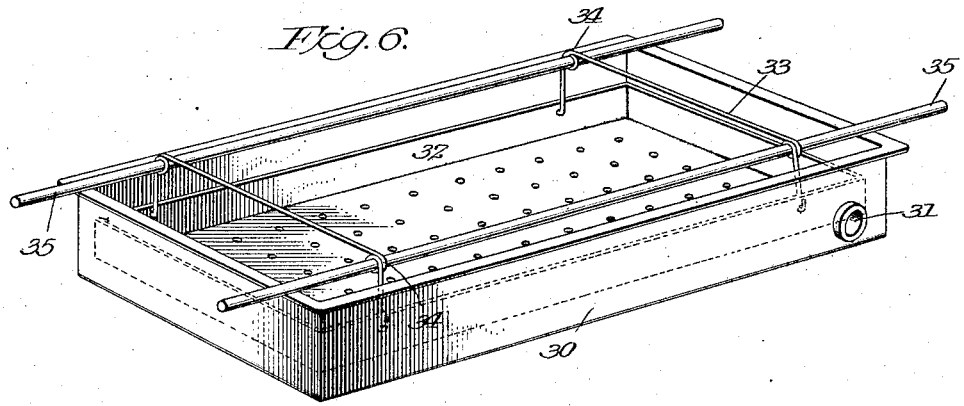
Figure 6 is a perspective view showing means for use in canning.

In these views 1 indicates the furnace which is preferably provided with an inner lining 2 which is separated from the walls by an asbestos lining 3. The furnace is provided with the feed door 4 and the ash opening 5 which is located in the bottom, an ash pan 6 being slidably mounted in guideways on the bottom so as to receive the ashes passing through the opening and this pan is so formed that it can be used for controlling the draft through said opening. A chimney pipe 7 is connected with the rear part of the furnace. An opening 9 is formed in one of the sides of the furnace, at the top thereof, and this opening is controlled by a sliding cover 10. A removable cover 11 is provided for the furnace, this cover having a handle 12 and an opening 13 therein which is closed by a cover plate 14. By closing opening 9 and placing the cover 11 on the furnace the same can be used like an ordinary stove for heating buildings and the like, the ash pan controlling the draft through the opening in the bottom of the furnace.

When the device is to be used for drying fruits, vegetables and the like when the same are in large pieces I provide a pan 15 which is adapted to fit in the upper part of the furnace and has a flange 16 at its top for engaging the upper edges of the furnace, thus holding the pan in place. This pan is provided with an opening 17 therein which is in alignment with the opening 9 in the furnace and said opening 17 is controlled by a cover plate 18. When the opening 17 is uncovered some of the heated air in the furnace will pass into the pan to act upon the material in said pan. This material is supported upon perforated trays 19 placed in the pan, each tray being provided with legs 20 and hook-shaped brackets 21, these brackets being located upon the upper parts of the trays and serving as a means for removing the trays by hooks or the like when said trays are heated and there is danger of burning the hands if the trays are touched. In order to more thoroughly distribute the heated air around and through the trays I may provide a perforated pipe 22 which rests on the bottom of the pan and has one end connected with the opening 17 so that the heated air from the furnace will pass through said perforated pipe which leads it under the trays, the air passing through the perforations in the pipes and upwardly through and around the trays and thus acts upon the material in the trays. After the material has been partially dried, the perforated pipe may be removed and the draft opening 17 closed by its plate 18 to finish the drying process more slowly which in some cases is desirable. During the first part of the operation the cover 11 is removed but in the latter operation the cover is put in place, with the opening therein uncovered.

I also provide a pan 23 which is provided with a water compartment 24 so that there is no danger of burning the material in the pan as the same is heated by the heat from the boiling water. The bottom of the pan forms the top of the water compartment and an outlet tube 25 is carried by said bottom and is so arranged that it will pass through the opening in the cover when said cover is in place. One wall of the water compartment has a screw threaded opening 26 therein which is located opposite the opening 9, and this opening 26 is adapted to receive the threaded end of a pipe 27 which carries the cock 28 and the gage glass 29. This tray can be used for drying fruits and vegetables and the like when the same are in small pieces.

When the apparatus is to be used for canning purposes a third pan 30 is used which is provided with a threaded hole 31 which is opposite the hole 9 and is adapted to receive the pipe 27 or a similar one which contains a cock so that water can be drawn from the pan. A perforated tray 32 is arranged to fit in the pan 30, said tray having handles 33 thereon provided with loops 34 for receiving rods 35, these rods projecting beyond the ends of the pan and acting to hold the tray above the water level in the pan. Thus the jars, cans or the like may be placed in the tray while the same is held out of the water and then when all the articles have been placed in the tray the rods are withdrawn to permit the tray with the articles thereon to drop into the water. The cover 11 is used with this pan to hold the heat and steam therein. This tray can also be used for laundry purposes and for heating water for different purposes. It can also be used for boiling molasses.

The first pan 15 with its trays can be used for chemically treating meats and the like by placing the meat in the trays and the chemicals in containers which are placed on the bottom of the pan. Then by putting the cover in position the fumes or vapors from the chemicals will be confined so that they will act upon the meats or other material on the trays. All the pans are provided with lifting rings 36.

From the foregoing it will be seen that the apparatus and its different parts can be used for a great many different purposes, the changes required being very quickly carried out.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a furnace having an open top, a pan having a flange at its top for engaging the edge of the furnace with the pan fitting in the upper part of the furnace, said furnace having an opening therein and the pan also having an opening therein in alignment with the first opening, a cover plate for closing the opening in the furnace and a cover for covering the pan.

2. An apparatus of the class described comprising a furnace having an open top, a pan having a flange at its top for engaging the edge of the furnace with the pan fitting in the upper part of the furnace, said furnace having an opening therein and the pan also having an opening therein in alignment with the first opening, a cover plate for closing the opening in the furnace, a cover for covering the pan, said cover having an opening in its top and means for closing the same.

3. An apparatus of the class described comprising a furnace having an open top, a pan fitting in the top of the furnace, removable trays for the pan and a cover for closing the top of the pan and for closing the furnace when the pan is removed.

4. An apparatus of the class described comprising a furnace having an open top, interchangeable pans for fitting in the top of the furnace, a removable cover for the furnace which covers the pan when the same is in place, each pan having a flange at its upper end for resting upon the upper edge of the furnace and the cover resting upon said flange.

In testimony whereof I affix my signature.

CLARENCE W. WELLS.